Figure 1:
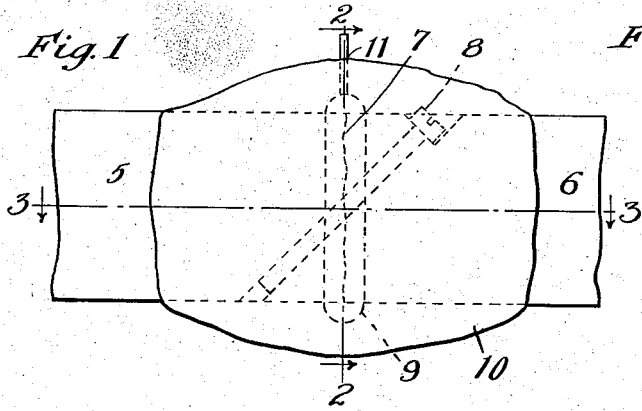

No. 827,134. PATENTED JULY 31, 1906.
L. L. WHITE.
PROCESS OF BRAZING METALS.
APPLICATION FILED JUNE 16, 1905.

Witnesses:
Wm. Geiger

Inventor:
Louis L. White
By Munday, Evarts & Adcock,
Attorneys

UNITED STATES PATENT OFFICE.

LOUIS L. WHITE, OF PORTLAND, OREGON, ASSIGNOR TO CHARLES E. LADD, OF PORTLAND, OREGON.

PROCESS OF BRAZING METALS.

No. 827,134.　　　Specification of Letters Patent.　　　Patented July 31, 1906.

Application filed June 16, 1905. Serial No. 265,552.

*To all whom it may concern:*

Be it known that I, LOUIS L. WHITE, a citizen of the United States, residing in the city of Portland, in the county of Multnomah and State of Oregon, have invented a new and useful Improvement in Processes of Brazing Metals, of which the following is a specification.

My invention relates to a new or improved process for the brazing or soldering together of metals of all kinds; but it is more particularly applicable to the brazing of either cast, malleable, or wrought iron, each to itself or one to the other. Its greatest usefulness, however, will probably be found in the brazing of pieces of cast-iron. The brazing is effected by the use of a commercial article generally known as "spelter," a flux of borax being first used, by the chemical action of which the pieces to be united are prepared for the application of spelter. Both the spelter and the flux are heated to a liquid form before being used. One of the chief difficulties heretofore experienced in the use of spelter for brazing has been the lack of a method of controlling the spelter within the two pieces of metal to be joined sufficiently long to enable a union to take place. By my process, hereinafter described, I am able to control the spelter for any necessary length of time, and thus overcome this difficulty, as hereinafter indicated.

My brazing process is carried on substantially as follows: The pieces of metal to be joined are temporarily joined together by suitable holding devices, an appreciable space being left between the two surfaces to be joined, and by my process this space, however large, may be filled with spelter and a union effected; but in ordinary use a very slight space only between the two pieces to be joined is left. The temporary clamping of the two pieces may be done by any suitable device which will enable the desired work to be accomplished, such as by rivets, braces, binding by wire, or other temporary device. I next ring the joint with a ring of soft wax rolled around the joint, pressing the same closely to the metal so as to exclude from the space between the two pieces to be joined any of the investment material hereinafter referred to. The purpose of this wax ring is also to provide a chamber around the joint and inside the investment when the wax has been melted away by the further process indicated below. This ring, however, can be formed of any other material that may be burned or otherwise disposed of by heat; but in practical experience the soft wax is preferable. The chamber thus formed, which is first filled with borax and subsequently with spelter, as indicated below, enables me to control the spelter sufficiently long to effect union. Access to the chamber is necessary to enable the borax and spelter to be applied, and I provide therefor an entrance and exit channel thereto through the investment material, which can be accomplished by small necks of wax connected with the wax ring and extending above the surface of the investment material, though sometimes, determined by the character of the work, but one channel will be required for access to the chamber, by means of which borax and spelter can be successively supplied, as indicated below in the further stages of the process. I next make a preparation of paste, preferably of fire-clay and asbestos, using approximately four parts of fire-clay and one of asbestos thoroughly mixed, so as to produce a paste of about the consistency of bread-dough. Any other investment material, however, which will resist the action of heat, may be used. I envelop or jacket the proposed joint, covered with its ring of wax, as above indicated, with this investment material, and if the parts to be brazed are small the best results from this investment are secured by binding it around the joint with a strip of cloth tightly drawn to make perfect contact between the joint and the investment material. I then subject the work to a moderate degree of heat for the purpose of driving off the moisture from the investment material, and the moisture having been evaporated the joint is left incased in a hard shell, which will resist the action of heat up to that degree which is necessary in the subsequent process without any resultant cracking or warping of the investment. The heat by which I drive out the moisture also melts the wax ring inside, the melted wax being either absorbed by the investment material or passing out from the chamber through the entrance and exit orifices thereto, thus leaving the joint encircled with a chamber inside the investment for receiving the borax and spelter in the subsequent process. The work is now ready for the furnace, no particular construction of which is necessary. Any fire which will heat the joint to be brazed to the proper degree of heat will answer the purpose. The work may be placed in an ordinary blacksmith forge, with coke or charcoal around the same in sufficient quantity to get the desired heat, or a gas or gasolene furnace may be used. I subject the joint to be brazed to a proper degree of heat, dependent somewhat upon the character of the metal to be brazed, but, generally speaking, to a bright cherry-red. Practical experience will guide the determination of the degree. When this proper degree of heat has been reached, the chamber around the joint is filled with liquid borax which has been melted for that purpose and which is poured through the orifice or inlet which has been prepared therefor. The borax completely fills the chamber inside the investment and finds its way in between the two pieces of metal to be brazed, and its action chemically prepares the metal for the reception of the spelter. Any other preparation which will act upon the surfaces of the joint in a similar way and chemically prepare them for the spelter may be substituted for the borax. The chamber being thus filled with borax, I immediately apply the substance commonly known in the commercial world as "spelter" and which in the meantime has been heated for this purpose, producing a liquid which will flow freely, the same being poured into the chamber already filled with liquid borax. The specific gravity of the spelter being heavier than that of the borax drives out the latter through the exit-orifice provided, or where a single opening to the chamber has been provided by way of entrance thereto this inlet may under some circumstances constitute the outlet. The chamber is thus gradually and completely filled with spelter, which has found its way in and around the joint, filling the chamber completely and also filling the space between the particles to be brazed and perfectly excluding the air from the joint and also from contact with the spelter itself except at the orifice. The work is now allowed to cool, the investment material holding the liquid spelter in place until the joint solidifies and the union is effected. When the work is cool, the investment material is broken away and the joint finished with a file or emery.

Figure 2:
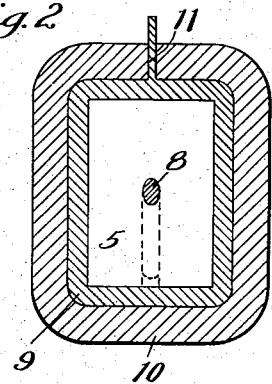
Figure 3:
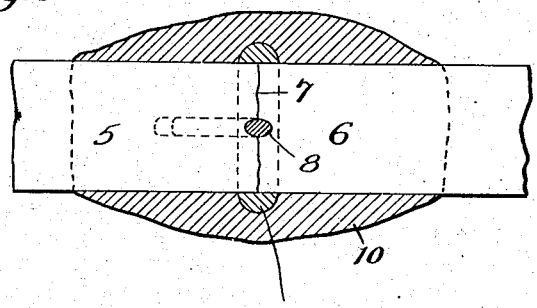
Figure 4:
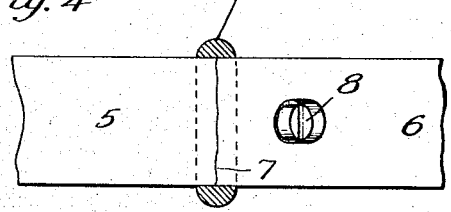

In the accompanying drawings, forming a part of this specification, I illustrate a joint in the different steps or stages involved in the practice of my process. Thus Figure 1 shows in broken lines the joint, the covering of wax, and the means employed for holding the parts together preparatory to the process of brazing, and in full lines the air-excluding jacket. Figs. 2 and 3 are sections on the lines 2 2 and 3 3 of Fig. 1. Fig. 4 shows the joint after brazing, but before the surplus spelter has been removed.

In the drawings, 5 and 6 represent the parts of a shaft or axle which has been broken at the line 7. The parts are secured together in any suitable way—as, for instance, by the screw 8, passed diagonally through the abutting ends. Around the break the covering 9, of wax or other fusible material, is first applied, and then an exterior jacket 10 of fire-resisting material is placed around the joint and outside of the wax, a sprue or opening 11 extending from the wax to the outside of the jacket, which may serve as an outlet for the melted wax and inlet for the borax and spelter. The joint prepared as shown at Fig. 1 is next inserted in a furnace or otherwise heated to fuse and drive out the wax, thereby forming a chamber within the jacket and around the joint. At the same time moisture in the jacket, if any, is driven off. As soon as the wax has been evaporated the parts will be in the condition shown in Figs. 2 and 3, with the exception that there will be an empty chamber around the joint in place of the wax. The borax is poured in at the sprue 11, filling the wax-chamber and the joint, and is followed by the spelter. Such of the spelter as does not enter the joint forms a ring 12 on the outside of the joint. This ring is chipped off or otherwise removed as the final step of the process.

Having thus described the process, I claim—

1. The improvement in the art of brazing metals, consisting in enveloping the joint with an air-excluding jacket of fire-clay and asbestos, or the like, and applying first borax and then spelter to the jacketed joint.

2. The improvement in the art of brazing metals, consisting in enveloping the joint with an air-excluding jacket of fire-resisting material having an internal chamber around the joint, pouring liquid borax into said chamber and then following the borax with liquid spelter, the chamber controlling the spelter while the latter is cooling.

3. The improvement in the process of brazing consisting in providing the joint with an air-excluding jacket of fire-resisting material within which is an open chamber surrounding the joint, and applying first a preparation for chemically preparing the surfaces of the joint to unite with the spelter and then spelter to the jacketed joint.

4. The improvement in the process of brazing consisting in providing the joint with an air-excluding jacket of fire-resisting material within which is an open chamber surrounding the joint, then heating the joint, and then filling the joint and chamber first with a preparation for chemically preparing the surfaces for the spelter and then with melted spelter.

LOUIS L. WHITE.

Witnesses:
ZERA SNOW,
H. H. PARKER.